(12) United States Patent
Yamada et al.

(10) Patent No.: US 7,389,003 B2
(45) Date of Patent: Jun. 17, 2008

(54) IMAGE PROCESSING SYSTEM AND IMAGE PROCESSING METHOD

(75) Inventors: Naoki Yamada, Tokyo (JP); Keiichi Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 10/778,249

(22) Filed: Feb. 17, 2004

(65) Prior Publication Data

US 2004/0169668 A1    Sep. 2, 2004

(30) Foreign Application Priority Data

Feb. 27, 2003  (JP) .............................. 2003-051591

(51) Int. Cl.
*G06K 9/32* (2006.01)
(52) U.S. Cl. .................. 382/298; 382/282; 382/284; 382/294; 358/538; 358/540; 358/453
(58) Field of Classification Search ................ 382/282, 382/284, 293, 294, 298; 358/538, 540, 453, 358/451
See application file for complete search history.

(56) References Cited

U.S. PATENT DOCUMENTS

| | | | | | |
|---|---|---|---|---|---|
| 5,187,776 | A | * | 2/1993 | Yanker ........................ 715/800 |
| 5,473,737 | A | * | 12/1995 | Harper ........................ 345/592 |
| 5,528,289 | A | * | 6/1996 | Cortjens et al. .......... 348/211.9 |
| 5,809,179 | A | * | 9/1998 | Marimont et al. ............ 382/254 |
| 6,078,701 | A | * | 6/2000 | Hsu et al. .................... 382/294 |
| 6,144,403 | A | * | 11/2000 | Otani ....................... 348/14.12 |
| 6,184,859 | B1 | * | 2/2001 | Kojima ........................ 345/629 |
| 6,392,658 | B1 | * | 5/2002 | Oura ........................... 345/629 |
| 6,407,747 | B1 | * | 6/2002 | Chui et al. .................. 345/660 |
| 6,552,744 | B2 | * | 4/2003 | Chen ........................ 348/218.1 |

* cited by examiner

*Primary Examiner*—Yosef Kassa
(74) *Attorney, Agent, or Firm*—Fitzpatrick, Cella, Harper & Scinto

(57) ABSTRACT

An image processing system of the present invention includes a partial enlarge unit for enlarging a part of an image so as to create an enlarged partial image, a display unit for displaying the image and the enlarged partial image created by the partial enlarge unit so that the enlarged partial image overlaps the image, a zoom processing unit for zooming the image displayed by the display unit, and a zoom process control unit for changing a position to be a criterion in case of the image zoom processing unit zooms the image according to whether the display unit displays the enlarged partial image so that the enlarged partial image overlaps the image.

18 Claims, 11 Drawing Sheets

IMAGE PROCESSING SYSTEM AND IMAGE PROCESSING METHOD

BACKGROUND OF THE INVENTION

1. Field of the Invention

The present invention relates to an image processing system for processing image data and displaying an image on a display device. Particularly the invention relates to the image processing system and an image processing method which display an enlarged partial image (magnifying glass function) overlapping a full image.

2. Description of the Related Art

Doctors photograph patients so as to obtain X-ray images and view the X-ray images so as to know conditions of the patients.

Conventionally, after X-ray devices photograph chests to obtain X-ray images and the images are developed on films, the images are viewed by using schauaukasten. Digital X-ray devices are developed, however, so that X-ray images are captured as digital data by computers. For this reason, X-ray images are recently displayed and viewed on monitors.

According to digitization of X-ray images, the contrast of the X-ray images can be changed on the monitors, and the X-ray images can be enlarged. When the X-ray images are enlarged, in most cases, a ratio is changed by using pointing devices such as mouse devices of computers. In this case, the images are normally enlarged and reduced at centers of the X-ray images. Further, it is publicly-known as the so-called "magnifying glass function" that a specified partial area of an X-ray image is enlarged and is displayed so as to overlap a full image.

In the case where a part of an X-ray image is displayed by the "magnifying glass function" so as to overlaps a full image, however, when the original full image is tried to be zoomed, the following problem arises. FIG. 12 is a diagram illustrating a conventional problem example in a portion of the "magnifying glass function" obtained by zooming a full image. In FIG. 12, a left side shows an X-ray image before a zoom process, and a right side shows an X-ray image after the zoom process. A reference numeral 20 designates a monitor screen, and it is a screen of a display device for displaying an X-ray image. A numeral 21 designates a full image and it is an image showing a full X-ray image. A numeral 22 designates an enlarged partial image. A part of the X-ray image (full image 21) in a predetermined position is enlarged by the "magnifying glass function" and is displayed with it overlapping the full image 21. A numeral 21' designates a full image after the zoom process (hereinafter, zoom full image), and it is an image which is zoomed at a center of the full image 21. A numeral 22' designates an enlarged partial image after the zoom process (hereinafter, zoom partial image), and it is the enlarged partial image in a predetermined position of the zoom full image 21'. Numerals 23 and 23' designate circles that represent a change in a position of partial enlargement on the full image 21 by the zoom process.

As shown in FIG. 12, since the full image 21 is zoomed at the center of the full image 21 displayed on the monitor 20, a positional relationship with the enlarged partial image 22 cannot be maintained. As a result, the position of the zoom partial image 22' on the full image 21' after the zoom process is partially enlarged. As represented by 23 and 23' in FIG. 12, the zoom position 23' shifts from the originally enlarged partial position 23. Further, due to this problem, a user should change the position of the magnifying glass after the zoom process, and move a visual point. As a result, user's thinking is interrupted, and thus the operating efficiency is deteriorated.

SUMMARY OF THE INVENTION

One aspect of the present invention is an image processing system for processing image data so as to display an image, which enlarges a part of an image so as to create an enlarged partial image, and can display the enlarged partial image so that it overlaps the image. Moreover, the image processing system can zoom the displayed image (original image before enlargement). Further, the image processing system changes a position to be a criterion in case of the image zoom unit zooms the image according to whether the enlarged partial image is displayed so as to overlap the image.

DESCRIPTION OF THE PREFERRED EMBODIMENTS

The embodiments of the present invention are explained below with reference to the accompanying drawings.

As one embodiment of the present invention, an image processing system for processing medical images (chest X-ray images) is explained. Subjects to be processed by the image processing system of the present invention are not limited to medical images, and various images may be processed.

Figure 1:
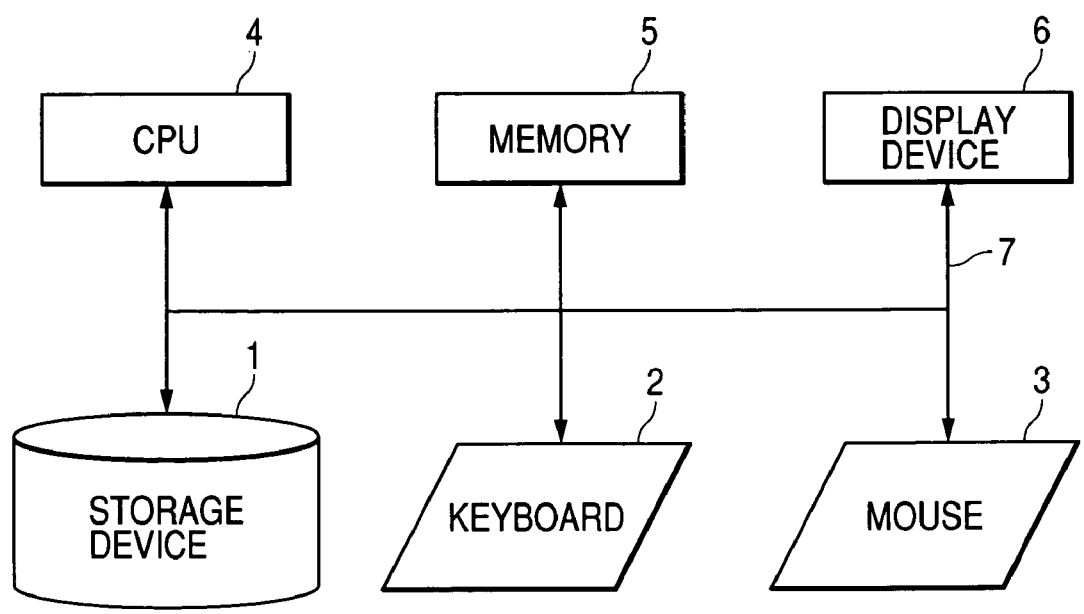
FIG. 1 is a diagram illustrating an example of a hardware structure of an image processing system according to one embodiment of the present invention.

FIG. 1 is a diagram illustrating an example of a hardware structure of the image processing system according to one embodiment of the present invention. In FIG. 1, a reference numeral 1 designates a storage device, and it stores a lot of image data to be processed by the image processing system, and programs and the like for realizing various processes in the image processing system. Specifically, the storage device 1 is storage medium such as a hard disc or a magneto-optical disc which can be read by a computer. A numeral 2 designates a keyboard, and it inputs instructions such as characters in the image processing system. A numeral 3 designates a mouse, and it makes selection using a pointer and inputs instructions on a screen of the image processing system.

A numeral 4 designates a CPU (Central Processing Unit), and it controls respective processing units in the image processing system, and executes the program read from the storage device 1 so as to process and operate the image data. A numeral 5 designates a memory, and it is a memory such as a RAM (Random Access Memory) for buffering image data, programs and various parameters such as display position and zoom ratio at the time of the process in the CPU 4. A numeral 6 designates a display device, and it displays the image data buffered in the memory 5 according to the various parameters buffered in the memory 5. Specifically, the display device 6 is a display device such as a CRT (Cathode Ray Tube) display or a liquid crystal monitor. The storage device 1, the keyboard 2, the mouse 3, the CPU 4, the memory 5 and the display device 6 are interconnected by a bus 7, and data can be transmitted/received therebetween.

First Embodiment

The image processing system having the hardware structure shown in FIG. 1 according to the first embodiment of the present invention is explained below.

Figure 2:
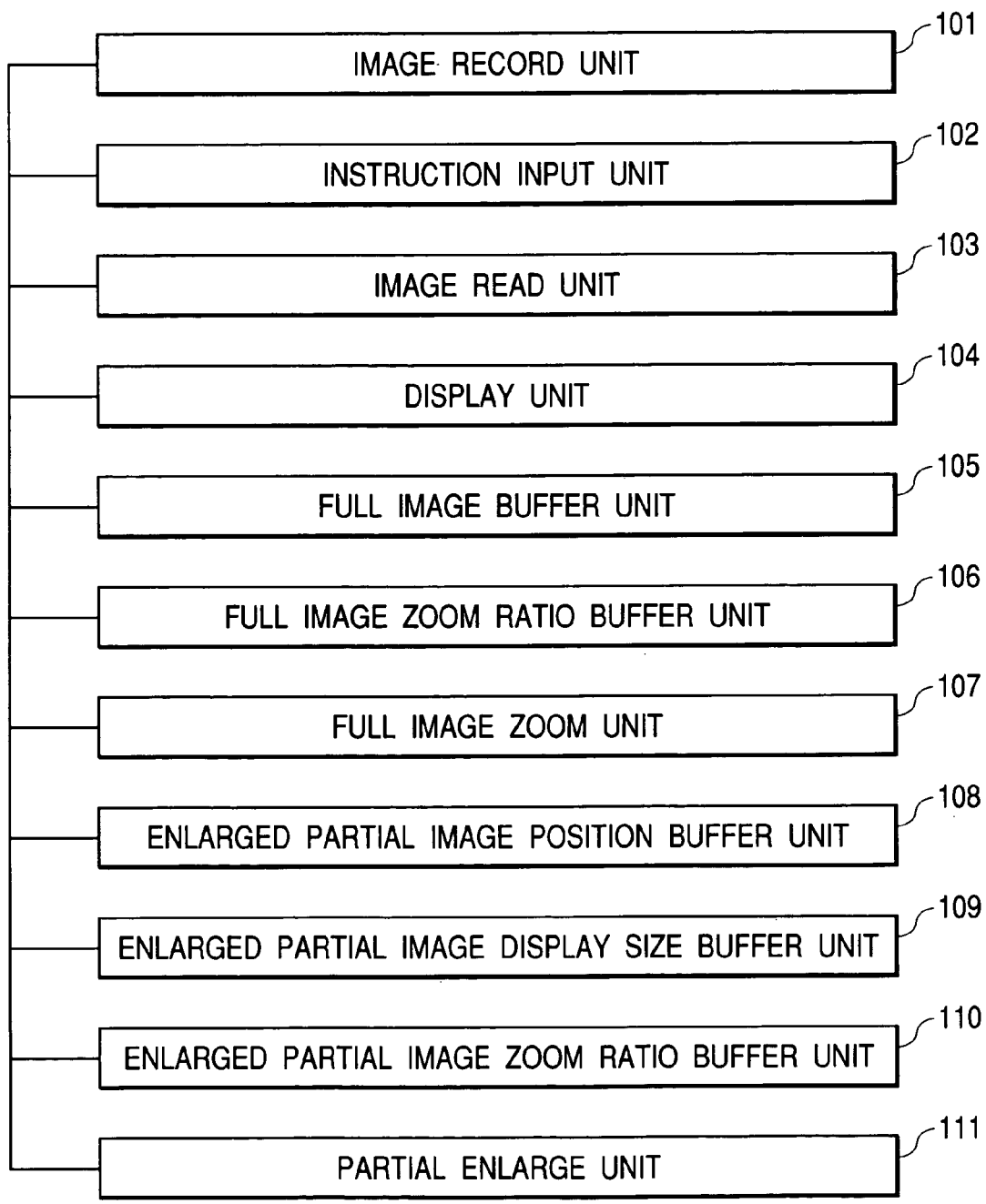
FIG. 2 is a block diagram illustrating a functional structure of the image processing system according to a first embodiment of the present invention.

FIG. 2 is a block diagram illustrating a functional structure of the image processing system according to the first embodiment of the present invention. In FIG. 2, a reference numeral 101 designates an image record unit, and it records a lot of image data (hereinafter, original image data) to be processed included in the storage device 1 of FIG. 1 thereinto. A numeral 102 designates an instruction input unit, and it is composed of the keyboard 2, the mouse 3 and the like. The instruction input unit 102 inputs instructions into the image processing system. 103 designates an image read unit, and when the instruction input unit 102 inputs an instruction for reading specified image data, the image read unit 103 reads the instructed image data from the image record unit 101.

A numeral 104 designates a display unit, and it displays a full image read by the image read unit 103, a full image zoomed by a full image zoom unit 107, mentioned later, an enlarged partial image created by a partial enlarge unit 111, mentioned later, and the like on the display device 6. A numeral 105 designates a full image buffer unit, and it buffers image data of a full image to be processed in the memory 5.

A numeral 106 designates a full image zoom ratio buffer unit, and it buffers a zoom ratio at the time of zooming the image data of the full image buffered in the full image buffer unit 105 into the memory 5. An initial value of the zoom ratio buffered by the full image zoom ratio buffer unit 106 is any one of values obtained by dividing a pixel value of a display area for the full image to be displayed on the display device 6 in a lateral direction or a lengthwise direction by a pixel value of the full image in the lateral or lengthwise direction (so-called fitness display). As explained specifically, the pixel values in the display area for the full image to be displayed on the display device 6 in the lateral and lengthwise directions are 1024 and 768, and the pixel values in the image data of the full image in the lateral and lengthwise directions are 2048 and 2560. In this case, the zoom ratio is 0.5 (=1024/2048) time, or 0.3 (=768/2560) time. The zoom ratio of the full image buffered in the full image zoom ratio buffer unit 106 can be changed by input from the instruction input unit 102.

A numeral 107 designates the full image zoom unit, and it refers to the zoom ratio of the full image buffered in the full image zoom ratio buffer unit 106 so as to zoom the image data of the full image buffered in the full image buffer unit 105. The full image zoom unit 107 normally zooms the full image at the center of the full image. When an enlarged partial image created by the partial enlarge unit 111, mentioned later, is displayed so as to overlap the full image, the full image zoom unit 107 zooms the full image at a center of the enlarged partial image buffered in an enlarged partial image position buffer unit 108, mentioned later.

A numeral 108 designates the enlarged partial image position buffer unit, and it buffers a center position of an area where the enlarged partial image obtained by enlarging the full image is displayed into the memory 5. A numeral 109 designates an enlarged partial image display size buffer unit, and it buffers a pixel values of the area where the enlarged partial image is displayed in the lateral and lengthwise directions into the memory 5. Further, a numeral 110 designates an enlarged partial image zoom ratio buffer unit, and it buffers the zoom ratio of the enlarged partial image to the full image in the memory 5. In the following explanation, the enlarged partial image position buffer unit 108 is abbreviated to the position buffer unit 108, the enlarged partial image display size buffer unit 109 is abbreviated to the size buffer unit 109, and the enlarged partial image zoom ratio buffer unit 110 is abbreviated to the zoom ratio buffer unit 110.

A numeral 111 designates the partial enlarge unit, and it refers to the zoom ratio of the full image buffered in the full image zoom ratio buffer unit 106, the center position of the enlarged partial image buffered in the position buffer unit 108, the pixel values of the areas where the enlarged partial image is displayed in the lateral and lengthwise directions buffered in the size buffer unit 109, and the zoom ratio of the enlarged partial image to the full image buffered in the zoom ratio buffer unit 110. The partial enlarge unit 111 creates an enlarged partial image from the full image buffered in the full image buffer unit 105. Specifically, the size buffer unit 109 and the zoom ratio buffer unit 110 buffer suitable initial values (for example, 128 as the lateral and lengthwise size, and 2 as the zoom ratio). When the center position of the area where the enlarged partial image is displayed is input from the instruction input unit 102, a coordinate of the center position is buffered as the initial value in the position buffer unit 108.

The partial enlarge unit 111 refers to the above-mentioned initial values, and outputs image data of the enlarged partial image obtained by enlarging a part of the full image. The display unit 104 overlaps the enlarged partial image output from the partial enlarge unit 111 and a predetermined position of the full image so as to display it on the display device 6. The position of the enlarged partial image overlapping the full image to be displayed which is partially enlarged can be freely moved by the instruction from the instruction input unit 102. The enlarged partial image and the coordinate of the position buffer unit 108 are successively updated according to the movement. Further, a display size of the enlarged partial image can be freely changed by the instruction from the instruction input unit 102, and the value buffered in the display size buffer unit 109 is successively updated according to the change.

A zoom operation on the full image by the image processing system according to the first embodiment is explained below.

Figure 3:
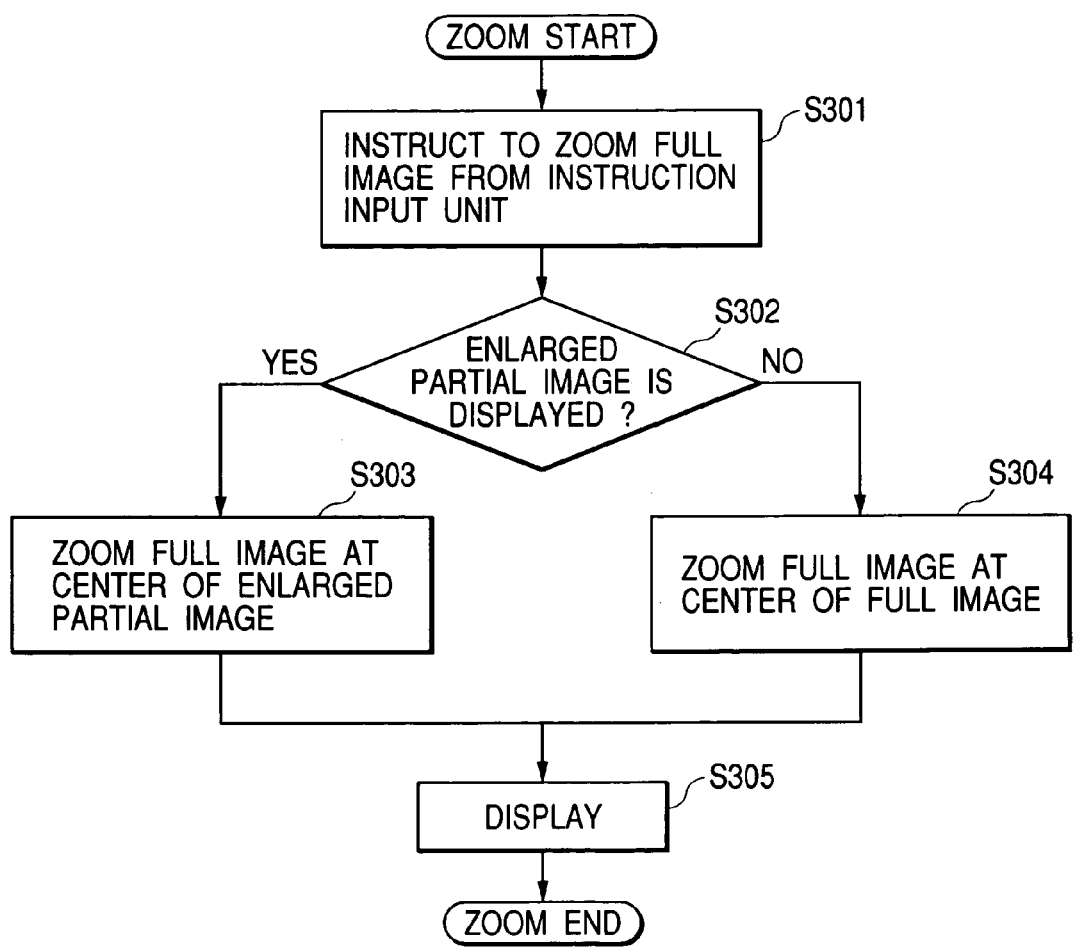
FIG. 3 is a flowchart illustrating a zoom operation of the image processing system according to the first embodiment.

FIG. 3 is a flowchart illustrating the zoom operation of the image processing system according to the first embodiment.

An instruction is input from the instruction input unit 102 so that the full image zoom unit 107 is instructed to zoom the full image at step S301. The image processing system checks whether the enlarged partial image created by the partial enlarge unit 111 is displayed so as to overlap the full image at step S302. When the enlarged partial image is displayed (Yes at step S302), the sequence goes to step S303, and the full image zoom unit 107 zooms the full image at the center of the enlarged partial image buffered in the position buffer unit 108. The sequence goes to step S305, and the display unit 104 displays the full image including the enlarged partial image after the zoom process on the display device 6.

When the enlarged partial image is not displayed (No at step S302), the sequence goes to step S304, and the full image zoom unit 107 refers to the zoom ratio of the full image buffered in the full image zoom ratio buffer unit 106, so as to zoom the image data of the full image buffered in the full image buffer unit 105. The sequence goes to step S305, and the display unit 104 displays the full image after the zoom process on the display device 6. The zoom process in the image processing system is ended here.

A display example that the full image is zoomed (enlarged) by the zoom process in FIG. 3 when the enlarged partial image is displayed is illustrated and is explained.

Figure 4:
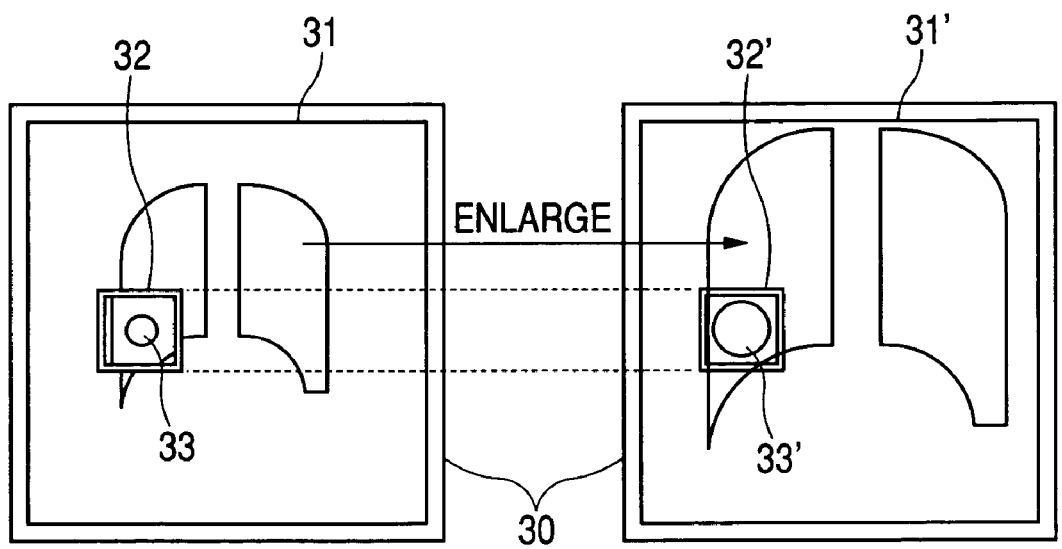
FIG. 4 is a diagram illustrating a display example where a full image is zoomed (enlarged) by the zoom process in FIG. 3 when an enlarged partial image is displayed.

FIG. 4 is a diagram illustrating the display example that the full image is zoomed (enlarged) by the zoom process in FIG. 3 when the enlarged partial image is displayed. In FIG. 4, the left side illustrates an X-ray image before the zoom process, and the right side illustrates an X-ray image after the zoom process. A reference numeral 30 designates a screen of the display device 6, and it shows an image before or after the process in the image processing system. A numeral 31 designates the full image before the zoom process, and it is displayed on the screen 30. A numeral 32 designates the enlarged partial image. The enlarged partial image is obtained in such a manner that the partial enlarge unit 111 enlarges a part of the full image 31, and it is displayed so as to overlap the full image 31.

Further, a numeral 31' designates the full image which is zoomed (enlarged) by the full image zoom unit 107 (hereinafter, the zoom full image). A numeral 32' designates an enlarged partial image which is displayed so as to overlap the enlarged zoom full image 31' (hereinafter, zoom partial image). A numeral 33 designates a circle representing a part of the image included in the enlarged partial image 32. A numeral 33' designates a circle where the circle 33 is zoomed (hereinafter, zoom circle).

As shown in FIG. 4, when the enlarged partial image 32 created by the partial enlarge unit 111 is displayed so as to overlap the full image 31, the full image 31 is zoomed (enlarged) by the full image zoom unit 107. As a result, the full image zoom unit 107 zooms (enlarges) the full image 31 at the center of the enlarged partial image 32 (=the center of the circle 33), namely, the center of the enlarged partial image buffered in the position buffer unit 108. As a result, the zoom partial image 32', which is displayed so as to overlap the zoom full image 31', becomes an image obtained by partially enlarging the center which is the same as that before the zoom process accurately without shifting from the displayed center before the zoom process. That is to say, the partial enlargement is carried out so that the circle 33 is positioned on the center of the enlarged partial image 32 before the zoom process and the zoom circle 33' is positioned on the center of the zoom partial image 32' after the zoom process.

In the image processing system according to the embodiment, when the enlarged partial image is displayed, even if the original full image is zoomed, the portion which is originally displayed by the enlarged partial image can be displayed accurately. As a result, since a user does not have to again change the position of the enlarged partial image and move a visual point after the zoom process unlike the prior art, the operating efficiency can be improved.

Second Embodiment

The image processing system having the hardware structure shown in FIG. 1 according to the second embodiment of the present invention is explained below. Since the functional structure of the image processing system according to the second embodiment is similar to the functional structure of the image processing system in the first embodiment shown in FIG. 2, the explanation thereof is omitted.

A different point of the image processing system according to the second embodiment from that according to the first embodiment is explained here. As shown in the enlarged partial image 32 and the zoom partial image 32' of FIG. 4, in the image processing system according to the first embodiment, when the full image including the enlarged partial image is zoomed, the size of the enlarged partial image is fixed. In the image processing system according to the second embodiment, however, when the full image including the enlarged partial image is zoomed, the size of the enlarged partial image is zoomed according to the zoom ratio of the full image. That is to say, the partial enlarge unit 111 in FIG. 2 further has a function for changing the size of the enlarged partial image according to the zoom ratio. Specifically, this function can be realized by changing the value of the display size of the enlarged partial image buffered in the display size buffer unit 109 according to the zoom ratio.

The zoom operation on the full image in the image processing system according to the second embodiment is explained below.

Figure 5:
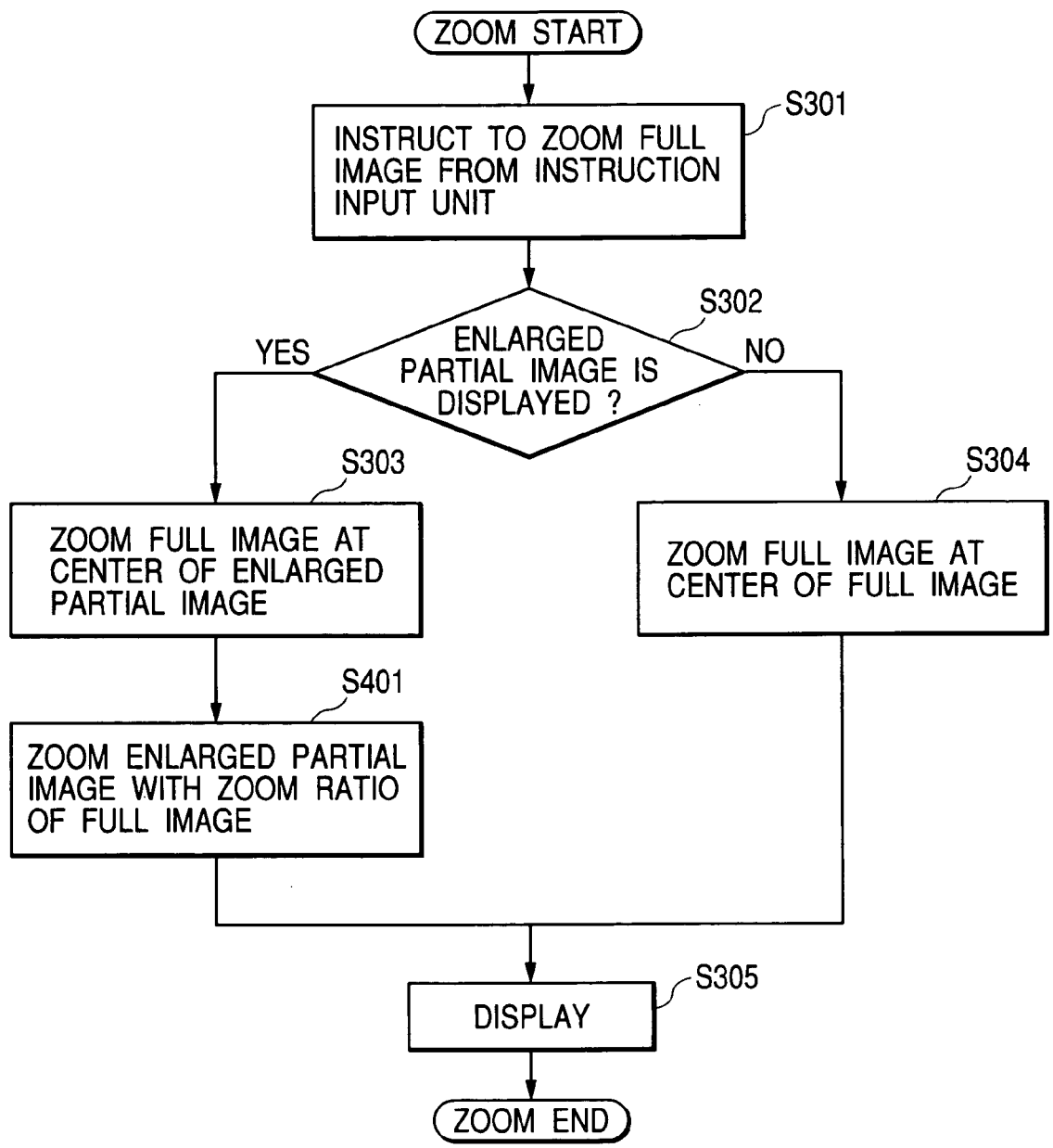
FIG. 5 is a flowchart illustrating the zoom operation of the image processing system according to a second embodiment.

FIG. 5 is a flowchart illustrating the zoom operation of the image processing system according to the second embodiment. Since the process at steps S301 to S304 in FIG. 5 is the same as that at steps S301 to S304 in FIG. 3, the explanation thereof is simplified. The instruction is input from the instruction input unit 102 so that the full image which is now being displayed is zoomed. At step S302, the image processing system checks whether the enlarged partial image is displayed so as to overlap the full image.

When the enlarged partial image is displayed (Yes at step S302), the sequence goes to step S303, so that the full image zoom unit 107 zooms the full image at the center of the enlarged partial image. The sequence goes to step S401, and the partial enlarge unit 111 refers to the zoom ratio of the full image buffered in the full image zoom ratio buffer unit 106, so as to zoom the enlarged partial image with the same zoom ratio as that of the full image. At this time, the partial enlarge unit 111 goes to step S305, and the display unit 104 displays the full image including the enlarged partial image undergoing the zoom process on the display device 6.

When the enlarged partial image is not displayed (No at step S302), the sequence goes to step S304, and the full image zoom unit 107 executes the zoom process on the image data of the full image. The sequence goes to step S305, and the display unit 104 displays the full image after the zoom process on the display device 6. The zoom process in the image processing system is ended here.

A display example that the full image is zoomed (enlarged) by the zoom process in FIG. 5 when the enlarged partial image is displayed is explained below.

Figure 6:
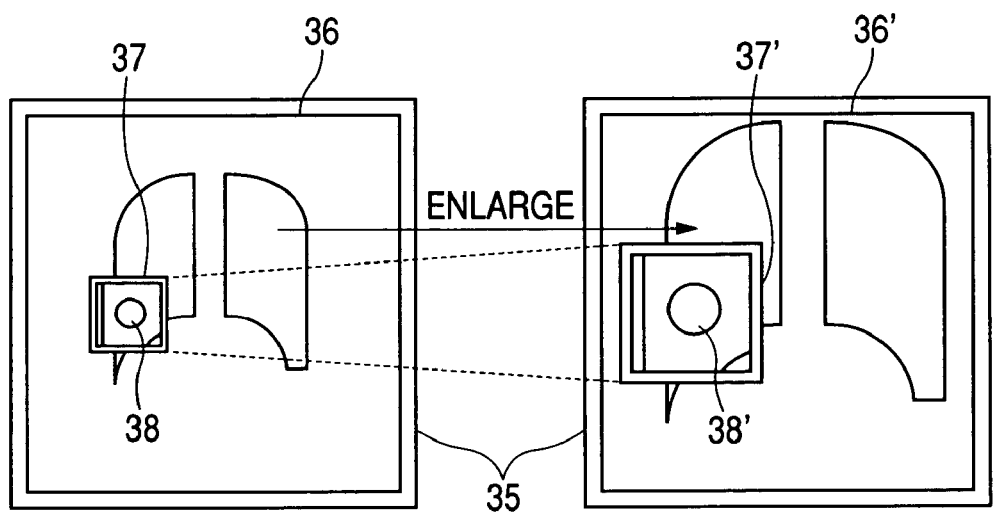
FIG. 6 is a diagram illustrating a display example where the full image is zoomed (enlarged) by the zoom process in FIG. 5 when the enlarged partial image is displayed.

FIG. 6 is a diagram illustrating the display example that the full image is zoomed (enlarged) by the zoom process in FIG.

5 when the enlarged partial image is displayed. In FIG. 6, the left side illustrates an X-ray image before the zoom process, and the right side illustrates the X-ray image after the zoom process. A numeral 35 designates a screen of the display device 6, and it shows the image before or after the process in the image processing system. A numeral 36 designates the full image before the zoom process, and it is displayed on the screen 35. A numeral 37 designates the enlarged partial image. The enlarged partial image 37 is obtained in a manner that the partial enlarge unit 111 enlarges a part of the full image 36, and it is displayed so as to overlap the full image 36.

A numeral 36' designates the full image which is zoomed (enlarged) by the full image zoom unit 107 (hereinafter, zoom full image). A numeral 37' designates the enlarged partial image which is displayed so as to overlap the enlarged zoom full image 36' (hereinafter, the zoom partial image). A numeral 38 designates a circle representing a part of the image included in the enlarged partial image 37. A numeral 38' designates a circle obtained by zooming the circle 38 (hereinafter, the zoom circle).

As shown in FIG. 6, when the enlarged partial image 37 created by the partial enlarge unit 111 is displayed so as to overlap the full image 36, the full image 36 is zoomed (enlarged) by the full image zoom unit 107. As a result, the full image zoom unit 107 zooms (enlarges) the full image 36 at the center of the enlarged partial image 37 (=center of the circle 38), namely, at the center of the enlarged partial image buffered in the position buffer unit 108. As a result, the zoom partial image 37', which is displayed so as to overlap the zoom full image 36', becomes an image obtained by partially enlarging the same center as that before the zoom process accurately without shifting from the displayed center before the zoom process. That is to say, the zoom process is executed so that the circle 38 is positioned on the center of the enlarged partial image 37 before the zoom process, the zoom circle 38' is positioned on the center of the zoom partial image 37' after the zoom process, and the zoom partial image 37' is enlarged according to the zoom ratio. As a result, the ratio of the displayed area between the enlarged partial image 37 before the zoom process and the zoom partial image 37' after the zoom process is not changed, and thus the user can observe the enlarged partial image more easily.

Third Embodiment

The image processing system having the hardware structure shown in FIG. 1 according to the third embodiment of the present invention is explained below. The image processing system according to the first and the second embodiments executes the zoom process at the center of the enlarged partial image so that the display position of the enlarged partial image is not shifted. The image processing system according to the third embodiment performs locating in such a manner that after the full image is zoomed, the position of the enlarged partial image is moved.

Figure 7:
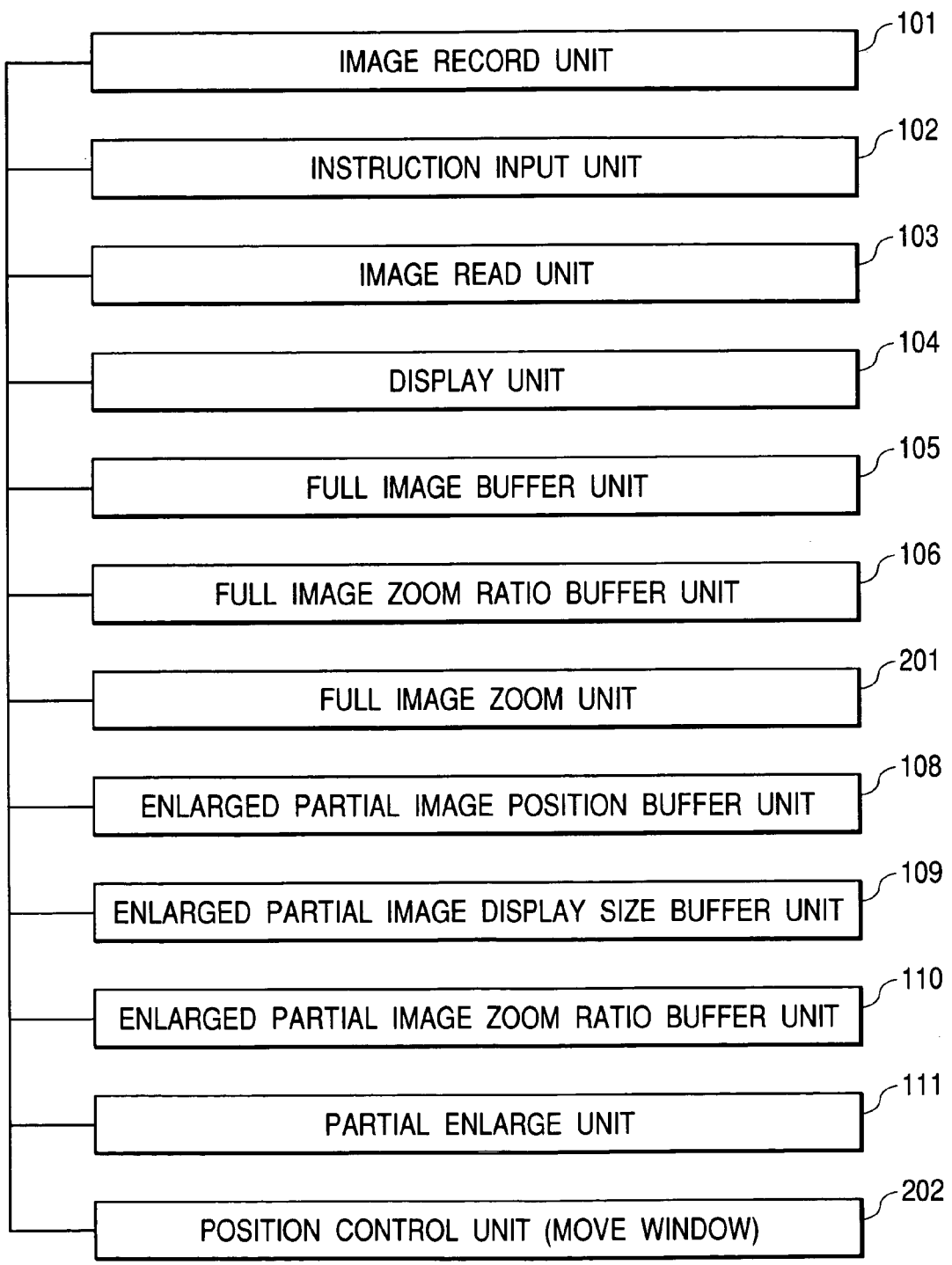
FIG. 7 is a block diagram illustrating a functional structure of the image processing system according to a third embodiment of the present invention.

FIG. 7 is a block diagram illustrating a functional structure of the image processing system according to the third embodiment of the present invention. In FIG. 7, since the functional blocks other than functional blocks of a full image zoom unit 201 and a position control unit 202 are similar to those designated by the same reference numerals in FIG. 2, the explanation thereof is omitted.

The full image zoom unit 201 refers to the zoom ratio of the full image buffered in the full image zoom ratio buffer unit 106, and zooms the full image buffered in the full image buffer unit 105. The full image zoom unit 201 according to this embodiment always zooms the full image at the center of the full image differently from the first and the second embodiments.

When the full image zoom unit 201 zooms the full image in a state that the enlarged partial image created by the partial enlarge unit 111 is displayed so as to overlap the full image, the position control unit 202 controls the position so that a position, which is the same as the portion of the enlarged partial image displayed in the overlapped manner before the zoom process, is partially enlarged and displayed even after the full image is zoomed. The specific process is explained below. In the case where the full image zoom unit 201 zooms the full image in the state that the enlarged partial image created by the partial enlarge unit 11 is displayed so as to overlap the full image, the full image zoom unit 201 executes the zoom process at the center of the full image. The position control unit 202 refers to the center position of the enlarged partial image buffered in the position buffer unit 108, and controls the center of the enlarged partial image so that the portion of the full image after the zoom process which is the same as the portion of the full image before the zoom process is displayed.

The zoom operation on the full image by the image processing system according to the third embodiment is explained below.

Figure 8:
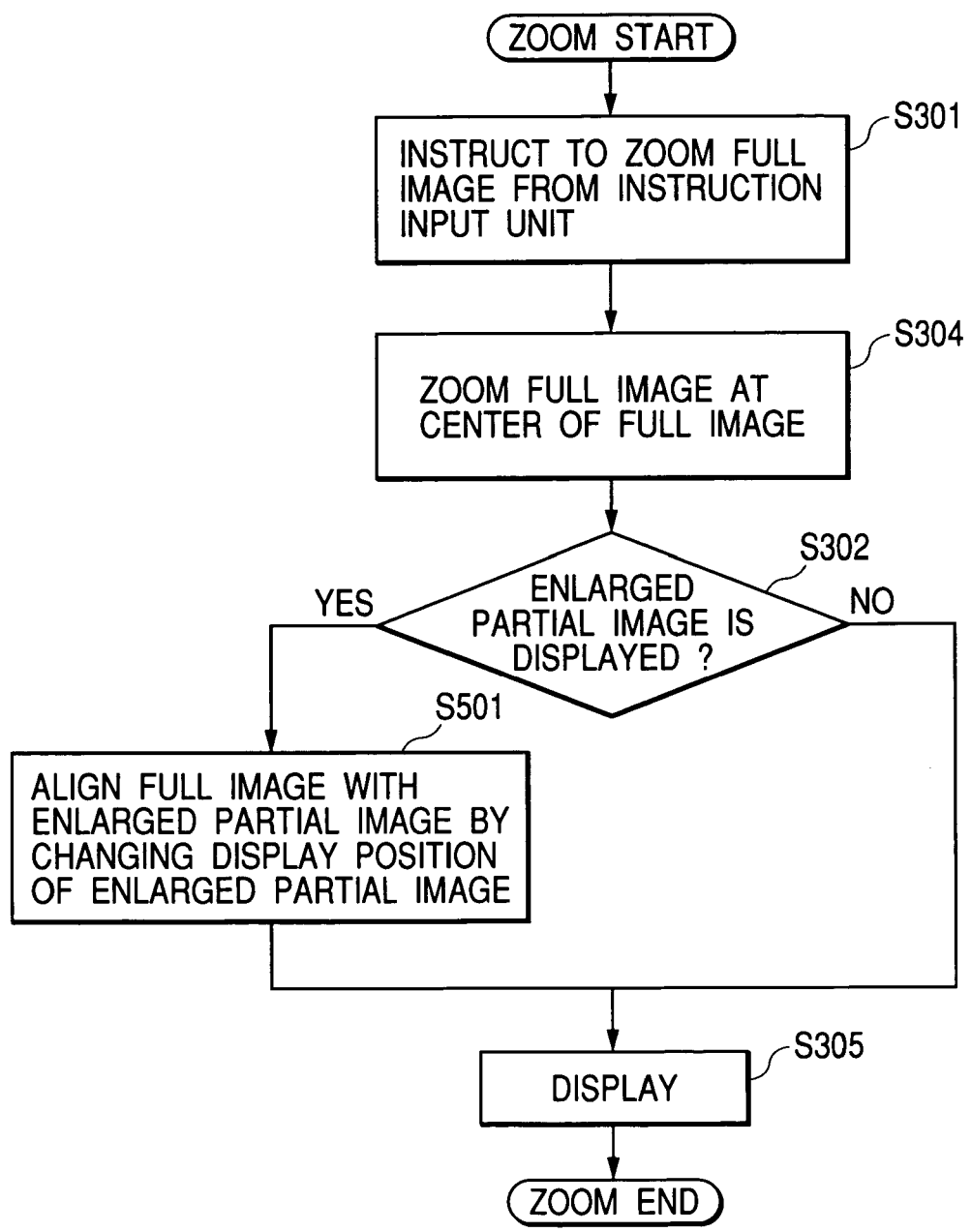
FIG. 8 is a flowchart illustrating the zoom operation of the image processing system according to a third embodiment.

FIG. 8 is a flowchart illustrating the zoom operation of the image processing system according to the third embodiment. An instruction is input from the instruction input unit 102 so that the full image zoom unit 107 zooms the full image at step S301. The sequence goes to step S304, and the full image zoom unit 107 refers to the zoom ratio of the full image buffered in the full image zoom ratio buffer unit 106. The full image zoom unit 107, then, zooms the image data of the full image buffered in the full image buffer unit 105 at the center of the full image. The image processing system checks whether the enlarged partial image created by the partial enlarge unit 111 is displayed so as to overlap the full image at step S302.

When the enlarged partial image is displayed (Yes at step S302), the sequence goes to step S501, and the position control unit 202 changes the center of the enlarged partial image buffered in the position buffer unit 108 so that the position, which is the same as the portion of the enlarged partial image before the full image is zoomed, is partially enlarged. The sequence goes to step S305, and the display unit 104 displays the full image including the enlarged partial image after the zoom process on the display device 6.

When the enlarged partial image is not displayed (No at step S302), the sequence goes to step S305, and the display unit 104 displays the full image after the zoom process on the display device 6. The zoom process in the image processing system is ended here.

A display example that the full image is zoomed (enlarged) by the zoom process in FIG. 8 when the enlarged partial image is displayed is illustrated and explained.

Figure 9:
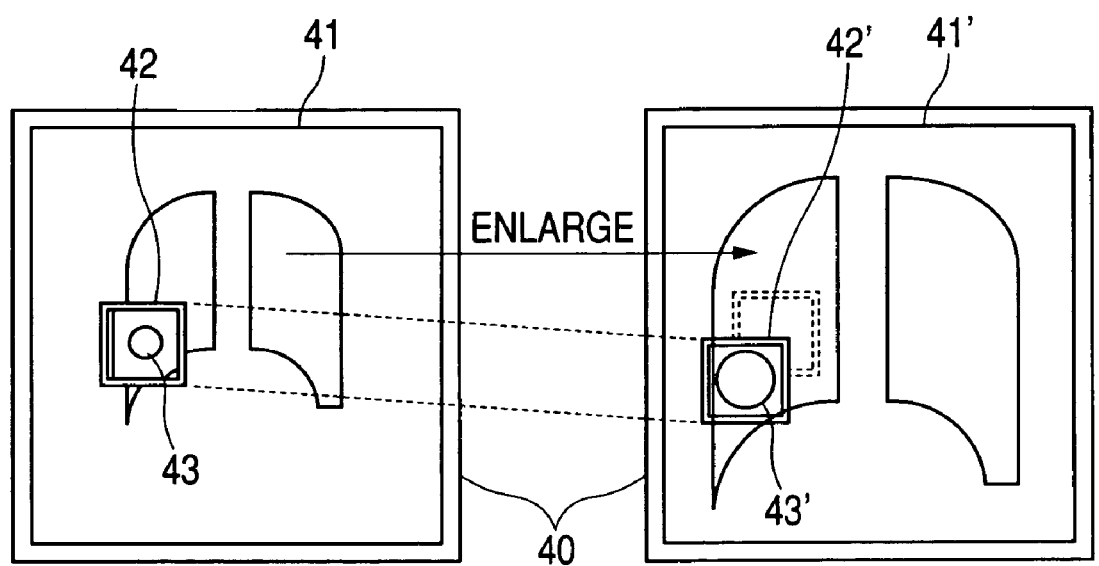
FIG. 9 is a diagram illustrating a display example where the full image is zoomed (enlarged) by the zoom process in FIG. 8 when the enlarged partial image is displayed.

FIG. 9 is a diagram illustrating the display example that the full image is zoomed (enlarged) by the zoom process in FIG. 8 when the enlarged partial image is displayed. In FIG. 9, the left side illustrates an X-ray image before the zoom process, and the right side illustrates an X-ray image after the zoom process. A reference numeral 40 designates a screen of the display device 6, and it shows the image before or after the process in the image processing system. A numeral 41 designates the full image before the zoom process, and it is displayed on the screen 40. A numeral 42 designates the enlarged partial image, and it is obtained in a manner that the partial enlarge unit 111 enlarges a part of the full image 41 and is displayed so as to overlap the full image 41.

A numeral 41' designates the full image which is zoomed (enlarged) by the full image zoom unit 201 (hereinafter, zoom full image). A numeral 42' designates the enlarged partial image which is displayed so as to overlap the enlarged zoom full image 41' (hereinafter, zoom partial image). A numeral 43 designates a circle showing a part of the image included in the enlarged partial image 42. A numeral 43' designates a circle obtained by zooming the circle 43 (hereinafter, zoom circle).

As shown in FIG. 9, when the enlarged partial image 42 created by the partial enlarge unit 111 is displayed so as to overlap the full image 41, the full image 41 is normally enlarged by the full image zoom unit 201 at the center of the full image. The position control unit 202 changes the center of the enlarged partial image 42 buffered in the enlarged partial image position buffer unit 108 so that the portion on the full image 41 after the zoom process which is the same as the portion on the full image 41 before zoom process is enlarged so as to be displayed.

As a result, as for the zoom partial image 42', which is displayed so as to overlap the zoom full image 41', the position which is the same as the portion displayed before the zoom process is displayed accurately without shifting from the position displayed before the zoom process. That is to say, the zoom process is executed so that the the circle 43 is positioned on the center of the enlarged partial image 42 before the zoom process and the zoom circle 43' is positioned on the center of the zoom partial image 42' after the zoom process. As a result, similarly to the first embodiment, since the user does not have to again change the position of the enlarged partial image (zoom partial image 42') after the zoom process and to move the visual point, the operating efficiency can be improved.

Fourth Embodiment

The image processing system having the hardware structure shown in FIG. 1 according to the fourth embodiment of the present invention is explained below. Since the functional structure of the image processing system according to the fourth embodiment is similar to the functional structure of the image processing system according to the third embodiment shown in FIG. 7, the explanation thereof is omitted.

A different point of the image processing system according to the fourth embodiment from the image processing system according to the third embodiment is explained here. In the image processing system according to the third embodiment, when the full image is zoomed, the size of the partial image enlarged by the magnifying glass function is fixed. In the image processing system according to the fourth embodiment, however, similarly to the second embodiment, when the full image is zoomed, the enlarged partial image is also zoomed according to the zoom ratio of the full image.

The zoom operation on the full image in the image processing system according to the fourth embodiment is explained below.

Figure 10:
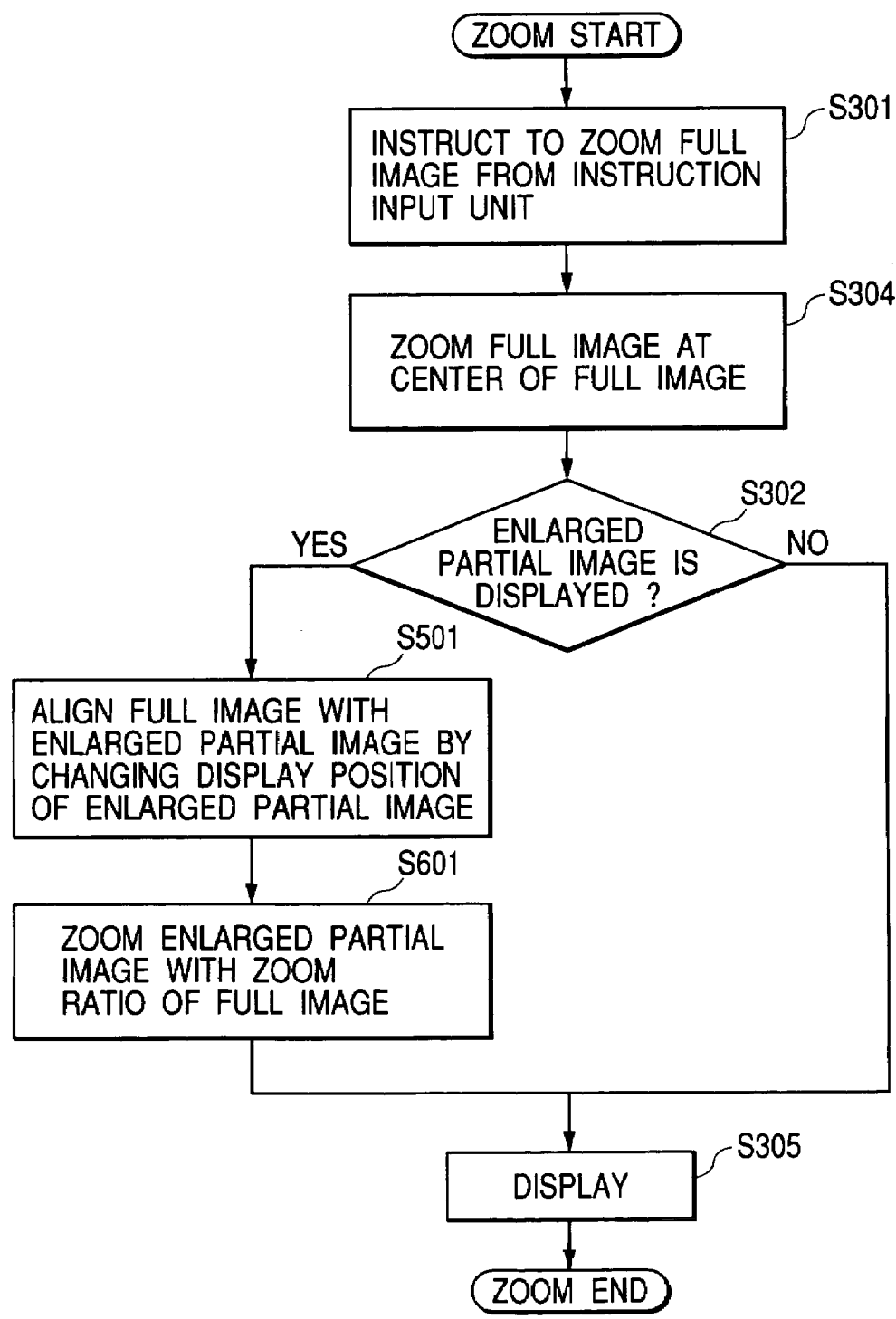
FIG. 10 is a flowchart illustrating a zoom operation of the image processing system according to a fourth embodiment.

FIG. 10 is a flowchart illustrating the zoom operation of the image processing system according to the fourth embodiment. Since the process at steps S301 to S501 in FIG. 10 is similar to the process at steps S301 to S501 shown in FIG. 8, the explanation thereof is simplified.

The instruction is input from the instruction input unit 102 so that the full image is zoomed at step S301. The sequence goes to step S304, and the full image zoom unit 107 zooms the image data of the full image buffered in the full image buffer unit 105 at the center of the full image. The image processing system checks whether the enlarged partial image is displayed so as to overlap the full image at step S302.

When the enlarged partial image is displayed (Yes at step S302), the sequence goes to step S501, and the position control unit 202 changes the center of the enlarged partial image buffered in the position buffer unit 108 so that the position, which is the same as the portion displayed on the enlarged partial image before the full image is zoomed, is partially enlarged. The sequence goes to step S601, and the partial enlarge unit 111 refers to the zoom ratio of the full image buffered in the full image zoom ratio buffer unit 106, so as to zoom the enlarged partial image according to the zoom ratio which is the same as that of the full image. The sequence goes to step S305, and the display unit 104 displays the full image including the enlarged partial image after the zoom process on the display device 6. When the enlarged partial image is not displayed (No at step S302), the sequence goes to step S305, and the display unit 104 displays the full image after the zoom process on the display device 6. The zoom process in the image processing system is ended here.

A display example that the full image is zoomed (enlarged) by the zoom process in FIG. 10 when the enlarged partial image is displayed is illustrated and explained.

Figure 11:
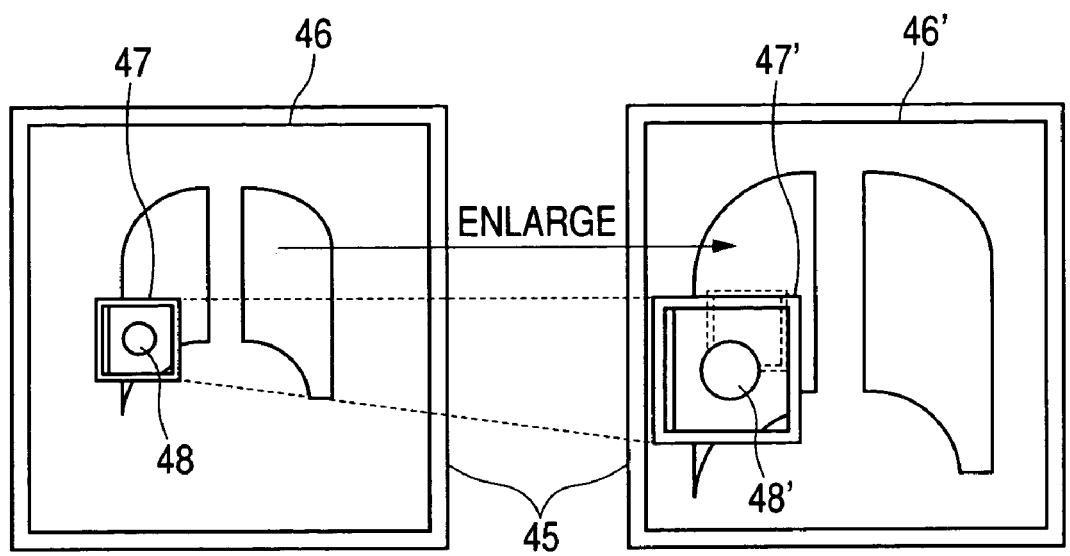
FIG. 11 is a diagram illustrating a display example where the full image is zoomed (enlarged) by the zoom process in FIG. 10 when the enlarged partial image is displayed.
Figure 12:
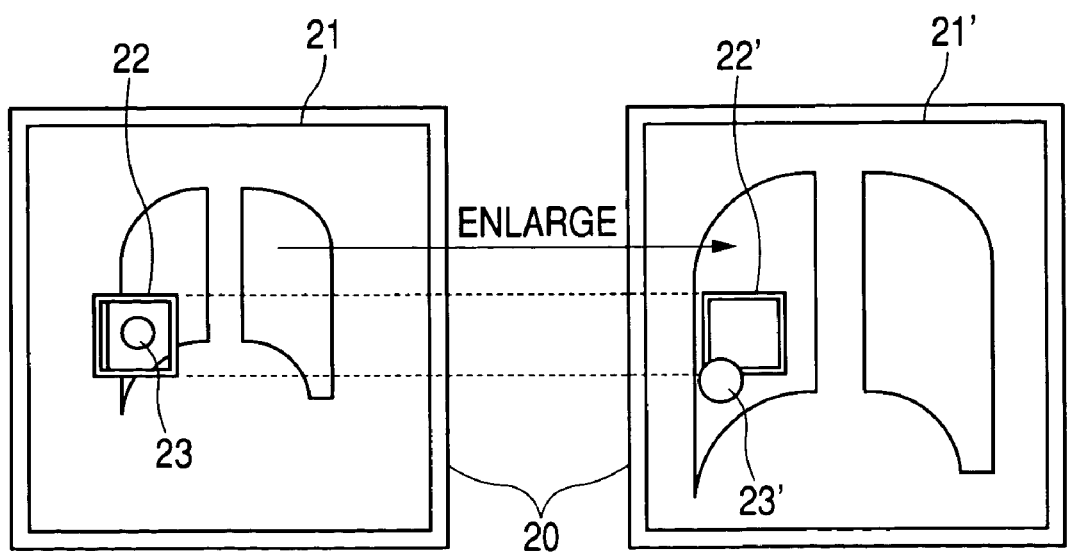
FIG. 12 is a diagram illustrating a conventional problem example in a "magnifying glass function" obtained by zooming a full image.

FIG. 11 is a diagram illustrating the display example that the full image is zoomed (enlarged) by the zoom process in FIG. 10 when the enlarged partial image is displayed. In FIG. 11, the left side illustrates an X-ray image before the zoom process, and the right side illustrates an X-ray image after the zoom process. A numeral 45 designates a screen of the display device 6, and it shows an image before or after the process in the image processing system. A numeral 46 designates a full image before the zoom process, and it is displayed on the screen 45. A numeral 47 designates an enlarged partial image, and the partial enlarge unit 111 enlarges a partial area of the full image 46, and the enlarged area is displayed so as to overlap the full image 46.

A numeral 46' designates the full image which is zoomed (enlarged) by the full image zoom unit 201 (hereinafter, zoom full image). A numeral 47' designates an enlarged partial image which is displayed so as to overlap the full enlarged zoom full image 46' (hereinafter, zoom partial image). A numeral 48 designates a circle showing a part of the image included in the enlarged partial image 47. A numeral 48' designates a circle obtained by zooming the circle 48 (hereinafter, zoom circle).

As shown in FIG. 6, when the enlarged partial image 47 created by the partial enlarge unit 111 is displayed so as to overlap the full image 46, the full image 46 is zoomed (enlarged) by the full image zoom unit 201. As a result, the enlarged partial image 47 is enlarged with the ratio which is the same enlarging ratio of the full image buffered in the full image zoom ratio buffer unit 106. That is to say, the zoom process is executed so that the circle 48 is positioned on the center of the enlarged partial image 47 before the zoom process, the zoom circle 48' is positioned on the center of the zoom partial image 47' after the zoom process, and the zoom partial image 47' is enlarged according to the zoom ratio. As a result, the ratio of the displayed area is not changed between the enlarged partial image 47 before the zoom process and the zoom partial image 47' after the zoom process, and thus the user can observe the enlarged partial image more easily.

As explained above, when the enlarged partial image is displayed by the image processing system of the present invention, even if the full image is zoomed, the positional relationship can be maintained. As a result, the portion which is originally enlarged can be displayed accurately even after the full image is zoomed. The user can be, therefore, suppress the movement of the visual point to the minimum, and user's thinking is not interrupted unlike the prior art. For this reason, efficient viewing is enabled, and the position of the magnifying glass should not be again changed unlike the prior art, so that the operability can be improved.

The respective processing units shown in FIGS. 2 and 7 may be realized a special hardware. Further, the processing units may be composed of memory and CPU, and programs for realizing the functions of the processing units are read into the memory so as to be executed, so that the functions may be realized.

The memory is composed of a hard disc device, a magneto-optical disc device, an involatile memory such as a flash memory, a read-only recording medium such as a CD-ROM, a volatile memory such as a RAM (Random Access Memory), or a recording medium including a combination of them which can be read or written by a computer.

The programs for realizing the functions of the processing units executing the various processes in FIGS. 2 and 7 are recorded into a recording medium readable by a computer, and the programs recorded into the recording medium are read into a computer system so as to be executed. In such a manner, the process may be executed. "The computer system" here includes OS and a hardware such as peripheral devices.

Further, "the computer system" includes a home page providing environment (or display environment) when the WWW system is used.

"The recording medium readable by the computer" is a handheld medium such as a flexible disc, a magneto-optical disc, a ROM or a CD-ROM, or a storage device such as a hard disc included in the computer system. Further, "the recording medium readable by the computer" includes a volatile memory (RAM) or the like in the computer system which buffers the programs for a constant time. The computer system becomes a server or a client when the programs are transmitted thereto via a network such as internet or a communication line such as a telephone line.

The programs may be transmitted from the computer system where the programs are stored in the storage device or the like to another computer system via a transmission medium or by a transmission wave of the transmission medium. "The transmission medium" which transmits the programs is a medium having a function for transmitting information like network such as internet (communication network) or a communication line such as a telephone line.

The programs may be for realizing a part of the functions. The functions may be a so-called differential file (differential program) which can be realized by a combination of the programs recorded in the computer system.

Further, a program product such as a recording medium readable by the computer which records the programs therein can be also applied as an embodiment to the present invention. The programs, the recording medium, the transmission medium and the program product are included in the scope of the present invention.

The embodiments of the present invention are explained above with reference to the drawings, but the specific structure is not limited to the embodiments, and thus design and the like which do not deviate from the scope of the invention are included.

According to the image processing system and the image processing method in the above embodiments, when the enlarged partial image is displayed, its positional relationship can be maintained even if the full image is zoomed, and the portion which is originally enlarged can be displayed accurately even after the full image is zoomed. The user can, therefore, suppress the movement of the visual point to the minimum, and the user's thinking is not interrupted. For this reason, the efficient viewing is enabled, and since the position of the magnifying glass should not be again changed, the operability can be improved.

What is claimed is:

1. An image processing system for processing image data and displaying an image, comprising:
   (a) a partial enlarge unit for enlarging a part of the image so as to create an enlarged partial image;
   (b) a display processing unit for processing, at a display device, a display of the image and the enlarged partial image which overlaps the image at a position of the part of the image;
   (c) a zoom processing unit for zooming the image displayed at the display device; and
   (d) a zoom process control unit for controlling the zoom processing unit to determine a position of the enlarged partial image as a center position when the zoom processing unit zooms the image, in a case in which the display processing unit processes a display of the enlarged partial image which overlaps the image.

2. The image processing system according to claim 1, wherein the zoom process control unit controls the image zoom processing unit to determine a center of the image as the position which is a criterion when the zoom processing unit zooms the image, in a case in which the display processing unit does not process a display of the enlarged partial image.

3. The image processing system according to claim 1, wherein a positional relationship between the image and an image enlarged by the partial enlarge unit can be changed, and the partial enlarge unit stores information about the changed positional relationship therein.

4. The image processing system according to claim 1, wherein the enlarged partial image is zoomed and displayed with a zoom ratio corresponding to a zoom ratio of the image.

5. An image processing system for processing image data so as to display an image, comprising:
   (a) a partial enlarge unit for enlarging a part of the image so as to create an enlarged partial image;
   (b) a display processing unit for processing, at a display device, a display of the image and the enlarged partial image which overlaps the image at a first position of the part of the image;
   (c) a zoom processing unit for zooming the image displayed at the display device around a position of a center of the image; and
   (d) a partial enlarge process control unit for controlling the display processing unit to change a display of the enlarged partial image at a second position of the part of the image zoom-processed by the zoom processing unit.

6. The image processing system according to claim 5, wherein a positional relationship between the image and an image enlarged by the partial enlarge unit can be changed, and the partial enlarge unit stores information about the changed positional relationship therein.

7. The image processing system according to claim 5, wherein a display size of the enlarged partial image created by the partial enlarge unit can be changed, and the partial enlarge unit stores information about the changed display size therein.

8. The image processing system according to claim 5, wherein the enlarged partial image is zoomed and displayed with a zoom ratio corresponding to a zoom ratio of the image.

9. An image processing method using an image processing system for processing image data so as to display an image, comprising:

(a) a first step of enlarging a part of the image so as to create an enlarged partial image;

(b) a second step of displaying the image and the enlarged partial image which overlaps the image;

(c) a third step of determining a position of the enlarged partial image as a center position when the image is zoomed, in a case in which the enlarged partial image which overlaps the image is displayed at the second step; and (d) a fourth step of zooming the image displayed at the second step on the position determined at the third step as the center position.

10. The image processing method according to claim 9, wherein a center of the image is determined as the center position when the image is zoomed at the third step, in a case in which the enlarged partial image is not displayed at the second step.

11. The image processing method according to claim 9, wherein the enlarged partial image is zoomed and displayed with a zoom ratio corresponding to a zoom ratio of the image.

12. An image processing method using an image processing system for processing image data so as to display an image, comprising:

(a) a first step of enlarging a part of the image so as to create an enlarged partial image;

(b) a second step of displaying the image and the enlarged partial image which overlaps the image at a first position of the part of the image;

(c) a third step of zooming the image displayed at the second step around a position of a center of the image; and (d) a fourth step of changing a display of the enlarged partial image at a second position of the part of the image zoom-processed at the third step.

13. The image processing method according to claim 12, wherein the enlarged partial image is zoomed and displayed with a zoom ratio corresponding to a zoom ratio of the image.

14. A computer-readable storage medium for storing a computer-readable program for processing image data so as to display an image, comprising:

(a) a first step of enlarging a part of the image so as to create an enlarged partial image;

(b) a second step of displaying the image and the enlarged partial image which overlaps the image;

(c) a third step of determining a position of the enlarged partial image as a center position when the image is zoomed, in a case in which the enlarged partial image which overlaps the image is displayed at the second step; and (d) a fourth step of zooming the image displayed at the second step on the position determined at the third step as the center position.

15. The computer-readable storage medium for storing the program according to claim 14, wherein a center of the image is determined as the center position when the image is zoomed at the third step, in a case in which the enlarged partial image is not displayed at the second step.

16. The computer-readable storage medium for storing the program according to claim 14, wherein the enlarged partial image is zoomed and displayed with a zoom ratio corresponding to a zoom ratio of the image.

17. A computer-readable storage medium for storing a computer-readable program for processing image data so as to display an image, comprising:

(a) a first step of enlarging a part of the image so as to create an enlarged partial image;

(b) a second step of displaying the image and the enlarged partial image which overlaps the image at a first position of the part of the image;

(c) a third step of zooming the image displayed at the second step around a position of a center of the image; and (d) a fourth step of changing a display of the enlarged partial image at a second position of the part of the image zoom-processed at the third step.

18. The computer-readable storage medium for storing the program according to claim 17, wherein the enlarged partial image is zoomed and displayed with a zoom ratio corresponding to a zoom ratio of the image.

* * * * *

UNITED STATES PATENT AND TRADEMARK OFFICE
CERTIFICATE OF CORRECTION

| | |
|---|---|
| PATENT NO. | : 7,389,003 B2 |
| APPLICATION NO. | : 10/778249 |
| DATED | : June 17, 2008 |
| INVENTOR(S) | : Naoki Yamada et al. |

It is certified that error appears in the above-identified patent and that said Letters Patent is hereby corrected as shown below:

COLUMN 1:

Line 35, "overlaps" should read --overlap--.

COLUMN 4:

Line 19, "a" should be deleted.

COLUMN 8:

Line 14, "unit 11" should read --unit 111--.

COLUMN 9:

Line 26, "the the" should read --the--.

COLUMN 10:

Line 67, "can be," should read --can,--.

COLUMN 11:

Line 7, "realized a" should read --realized by--.

Signed and Sealed this

Ninth Day of December, 2008

JON W. DUDAS
*Director of the United States Patent and Trademark Office*